(No Model.)
A. SCAMAHORN.
STAVE SAW GUMMER.
No. 482,386. Patented Sept. 13, 1892.
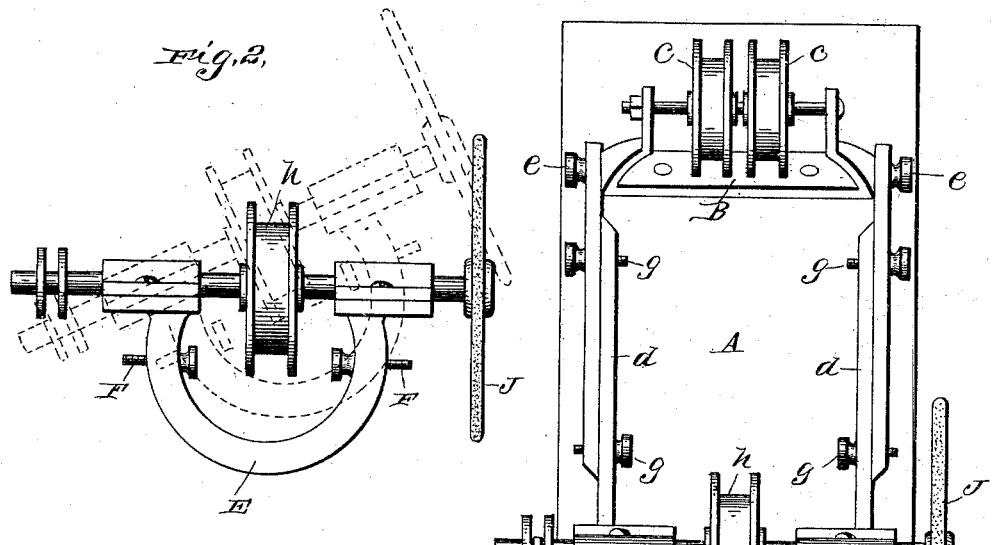
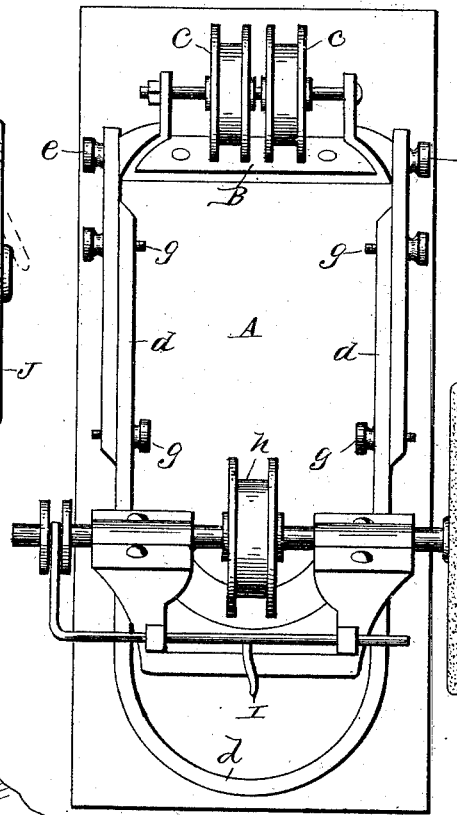
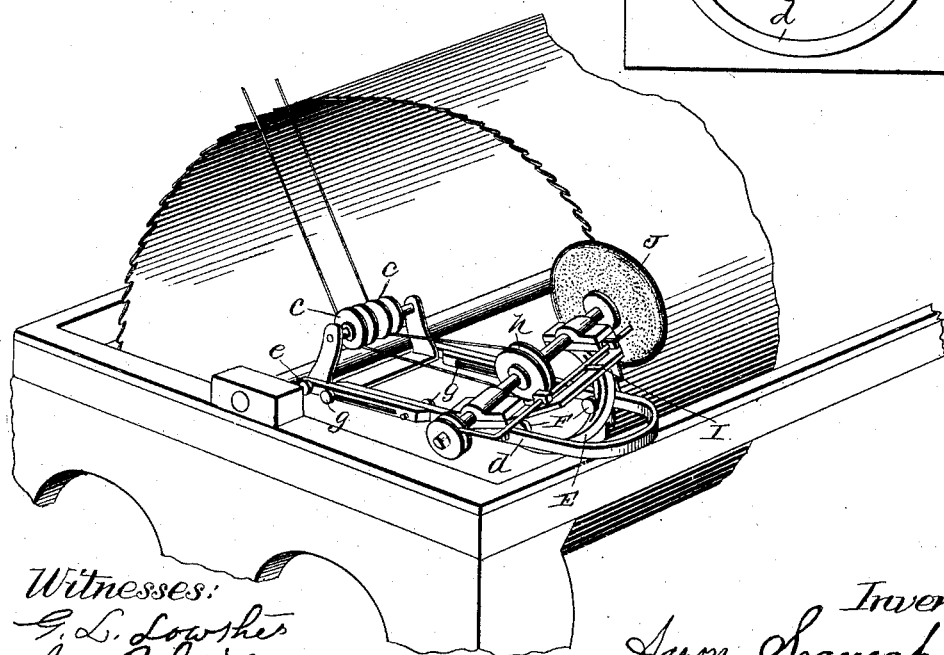
Witnesses:
G. L. Lowther
A. B. Wilson
Inventor:
Aaron Scamahorn

UNITED STATES PATENT OFFICE.

AARON SCAMAHORN, OF PURSLEY, WEST VIRGINIA.

STAVE-SAW GUMMER.

SPECIFICATION forming part of Letters Patent No. 482,386, dated September 13, 1892.

Application filed September 2, 1891. Serial No. 404,570. (No model.)

*To all whom it may concern:*

Be it known that I, AARON SCAMAHORN, a citizen of the United States, residing at Pursley, county of Tyler, State of West Virginia, have invented certain new and useful Improvements in Stave-Saw Gummers; and I do hereby declare that the following is a full, clear, and exact description of the invention, which will enable others skilled in the art to which it appertains to operate and use the same.

My invention relates to improvements in machines for gumming and shaping stave-saws; and it consists in certain features of construction and combination of parts, hereinafter described, and pointed out in the claim.

Figure 1 is a top or end view of the entire machine. Fig. 2 shows the yoke, mandrel-pulley, and emery-wheel. Fig. 3 represents the gummer as at work on a cylinder saw.

Similar letters refer to similar parts throughout the several views.

A is the board to which the iron bed-plate B is fastened, the latter supporting two loose pulleys c c. The iron frame d d is secured to the bed-plate B by two thumb-screws e e, allowing the frame to work as on a hinge. By this device the operator can raise the gummer to an upright position and begin gumming at the top of the saw and gum one tooth after the other on down until the yoke rests on the board A, thus allowing the operator to gum ten or twelve teeth without turning the saw, which is a great convenience and saving of time in gumming. (See Fig. 3.)

The yoke E has slots through its sides, and two thumb-screws pass through the same into iron frame d d. By the use of these slots the yoke E can be turned to right or left to give the saw-teeth any pitch desired, and when made fast to the iron frame d d by the two thumb-screws F F the saw-teeth will all be of one shape and pitch. By this device the greatest difficulty and trouble in sharpening cylinder saws are overcome, as one tooth cannot get longer or shorter than another and the saw will never require rounding up.

By means of slots in the iron frame d d and the use of the thumb-screws g g g g the frame can be adjusted long or short to suit any size saw from twenty to forty-five inches in diameter. h is the mandrel-pulley by which the mandrel is driven by a cord or belt running to same from driving-wheel. This cord or belt passes under the wheels c c, allowing the gummer to be raised to an upright position when gumming without any variation in the belt. I is the thumb-lever to give the mandrel end motion when gumming. By the use of this lever the emery-wheel J is placed into the saw-gullet by the operator's thumb and kept there until the tooth is gummed. Then the gummer is raised out of the gullet and the thumb removed from the lever, and the emery-wheel may be slid back with no danger of coming in contact with the saw until placed into the gullet again by the thumb-lever.

What I do claim as my invention, and desire to secure by Letters Patent, is—

In a stave-saw-gumming machine, the combination of the base-plate B, the frame pivoted to the base-plate, the slotted yoke E, secured to the frame by thumb-screws, the slidable mandrel or arbor carrying the grinding-disk, journaled in the yoke, and the pulleys and belt, all arranged and operating substantially as described.

AARON SCAMAHORN.

Witnesses:
G. L. LOWTHER,
A. B. WILSON.